United States Patent
Zarrabi (10) Patent No.: US 12,104,843 B2
(45) Date of Patent: Oct. 1, 2024

(54) TRANSPORT REFRIGERATION SYSTEM ENERGY MANAGEMENT SYSTEM AND METHOD

(71) Applicant: Carrier Corporation, Palm Beach Gardens, FL (US)

(72) Inventor: Jamal Zarrabi, Les Andelys (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/452,888

(22) Filed: Oct. 29, 2021

(65) Prior Publication Data

US 2022/0136758 A1    May 5, 2022

Related U.S. Application Data

(60) Provisional application No. 63/198,694, filed on Nov. 5, 2020.

(51) Int. Cl.
*F25D 23/00* (2006.01)
*F25D 11/00* (2006.01)

(52) U.S. Cl.
CPC ............ *F25D 23/00* (2013.01); *F25D 11/003* (2013.01); *F25D 2400/40* (2013.01)

(58) Field of Classification Search
CPC ..... F25D 23/00; F25D 11/003; F25D 2400/40
See application file for complete search history.

(56) References Cited

U.S. PATENT DOCUMENTS

| 10,543,735 B2 | 1/2020 | Colavincenzo |
| 10,654,369 B2 | 5/2020 | Healy |
| 10,730,393 B2 | 8/2020 | Crombez et al. |

(Continued)

FOREIGN PATENT DOCUMENTS

| EP | 2689944 A2 * | 1/2014 | ......... B60H 1/00428 |
| GB | 2497102 A * | 6/2013 | ........... B64D 41/007 |

(Continued)

OTHER PUBLICATIONS

JP-6389640-B2 Translation (Year: 2018).*

(Continued)

*Primary Examiner* — David J Teitelbaum
(74) *Attorney, Agent, or Firm* — Souad Hakim (57) ABSTRACT

A system and method for operating a transport refrigeration system including: a trailer system including a vehicle connected to a transport container; an electric generation device operably connected to a wheel axle of the trailer system, the electric generation device configured to rotate at an operating frequency, and to generate electrical power from the rotational energy of the wheel axle for charging an energy storage device when the electric generation device is activated; an energy management system for providing power to the transportation refrigeration unit of the trailer system, the energy management system including an energy controller in communication with at least one of the electric generation device and the energy storage device, wherein the energy controller is configured to modify the operation of the electric generation device when the operating frequency of the electric generation device is equal to or less than an energy controller operating limit.

15 Claims, 3 Drawing Sheets

(56) References Cited

U.S. PATENT DOCUMENTS

| | | |
|---|---|---|
| 2007/0135257 A1 | 6/2007 | Bissontz |
| 2008/0023965 A1* | 1/2008 | Cagliari ............... B60H 1/3222 |
| | | 290/1 R |
| 2015/0019058 A1 | 1/2015 | Georgiev |
| 2018/0347864 A1* | 12/2018 | Chopko ................ F25D 29/003 |
| 2019/0288350 A1* | 9/2019 | Saroka ................ H01M 10/625 |
| 2021/0095547 A1* | 4/2021 | Grueschow ........... E21B 43/123 |
| 2021/0363919 A1* | 11/2021 | Repentin ................ F02C 1/105 |

FOREIGN PATENT DOCUMENTS

| | | | |
|---|---|---|---|
| JP | 6389640 B2 * | 9/2018 | ........... F01K 23/065 |
| WO | 2020068502 A1 | 4/2020 | |
| WO | 2020072706 A1 | 4/2020 | |

OTHER PUBLICATIONS

EP-2689944-A2 Translation (Year: 2014).*
Extended European Search Report received for EP Application No. 21205714.5, mailed on Apr. 4, 2022, 09 Pages.

* cited by examiner

TRANSPORT REFRIGERATION SYSTEM ENERGY MANAGEMENT SYSTEM AND METHOD

CROSS REFERENCE TO A RELATED APPLICATION

The application claims the benefit of U.S. Provisional Application No. 63/198,694 filed Nov. 5, 2020, the contents of which are hereby incorporated in their entirety.

BACKGROUND

The embodiments herein generally relate to transport refrigeration systems and more specifically, the energy management of such transport refrigeration systems.

Typically, cold chain distribution systems are used to transport and distribute cargo, or more specifically perishable goods and environmentally sensitive goods (herein referred to as perishable goods) that may be susceptible to temperature, humidity, and other environmental factors. Perishable goods may include but are not limited to fruits, vegetables, grains, beans, nuts, eggs, dairy, seed, flowers, meat, poultry, fish, ice, and pharmaceuticals. Advantageously, cold chain distribution systems allow perishable goods to be effectively transported and distributed without damage or other undesirable effects.

Refrigerated vehicles and trailers are commonly used to transport perishable goods in a cold chain distribution system. A transport refrigeration system is mounted to the vehicles or to the trailer in operative association with a cargo space defined within the vehicles or trailer for maintaining a controlled temperature environment within the cargo space.

Conventionally, transport refrigeration systems used in connection with refrigerated vehicles and refrigerated trailers include a transportation refrigeration unit having a refrigerant compressor, a condenser with one or more associated condenser fans, an expansion device, and an evaporator with one or more associated evaporator fans, which are connected via appropriate refrigerant lines in a closed refrigerant flow circuit. Air or an air/gas mixture is drawn from the interior volume of the cargo space by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the cargo space.

On commercially available transport refrigeration systems used in connection with refrigerated vehicles and refrigerated trailers, the compressor, and typically other components of the transportation refrigeration unit, must be powered during transit by a prime mover. In mechanically driven transport refrigeration systems the compressor is driven by the prime mover, either through a direct mechanical coupling or a belt drive, and other components, such as the condenser and evaporator fans are belt driven.

Transport refrigeration systems may also be electrically driven. In an electrically driven transport refrigeration system, a prime mover carried on and considered part of the transport refrigeration system, drives an electric generation device, such as an AC synchronous generator that generates AC power. The generated AC power is used to power an electric motor for driving the refrigerant compressor of the transportation refrigeration unit and also powering electric AC fan motors for driving the condenser and evaporator motors, and electric heaters associated with the evaporator.

The generated AC power may also be stored in an energy storage device, such as a battery. In some instances, the electric generation device may be operably coupled to a wheel axle of the refrigeration vehicle or the refrigeration trailer. The electric generation device may also be operably coupled to an energy controller which, among other things, may control the operation of the electric generation device. The term "operably coupled" as used throughout means any direct or indirect connection to any other component(s).

It may be desirable under certain vehicle operating conditions, such as during activation of an anti-lock brake system on the vehicle and/or the trailer, to modify the operation of the electric generation device to ensure safe operation.

BRIEF DESCRIPTION

According to one embodiment a transport refrigeration system including: a trailer system including a vehicle connected to a transport container; an electric generation device operably connected to a wheel axle of the trailer system, the electric generation device configured to rotate at an operating frequency, and to generate electrical power from the rotational energy of the wheel axle for charging an energy storage device when the electric generation device is activated; an energy management system for providing power to the transportation refrigeration unit of the trailer system, the energy management system including an energy controller in communication with at least one of the electric generation device and the energy storage device, wherein the energy controller is configured to modify the operation of the electric generation device when the operating frequency of the electric generation device is equal to or less than an energy controller operating limit.

In addition to one or more of the features described above, or as an alternative, further embodiments the transport refrigeration system wherein an operating frequency includes at least one of a limit and a range of: a frequency, a time period, and a time interval, of the electric generation device.

In addition to one or more of the features described above, or as an alternative, further embodiments the transport refrigeration system wherein the energy controller operating limit includes at least one of a limit and a range of: a frequency, a time period, and a time interval, the limit and range indicative of an anti-lock braking system (ABS) activation.

In addition to one or more of the features described above, or as an alternative, further embodiments the transport refrigeration system wherein modifying the operation of the electric generation device includes decoupling the electric generation device from the energy storage device when the energy controller operating limit is at least one of: a frequency of 25 Hz or less, and a negative speed variation equal to or less than −1 Hz per second, for an electric generation device operating frequency that is equal to or greater than 1 Hz and equal to or less than 10 Hz.

In addition to one or more of the features described above, or as an alternative, further embodiments the transport refrigeration system wherein decoupling of the electric generation device from the energy storage device occurs within 25 milliseconds of when the frequency operating condition is equal to or less than the operating limit.

In addition to one or more of the features described above, or as an alternative, further embodiments the transport refrigeration system wherein modifying the operation of the electric generation device includes recoupling the electric generation device to the energy storage device after a lapse of time.

In addition to one or more of the features described above, or as an alternative, further embodiments the transport refrigeration system wherein the lapse of time is equal to or greater than 60 seconds.

In addition to one or more of the features described above, or as an alternative, further embodiments the transport refrigeration system wherein the energy storage device includes at least one of a battery, and a fuel cell.

In addition to one or more of the features described above, or as an alternative, further embodiments the transport refrigeration system wherein the electric generation device includes at least one of: a permanent magnet AC generator, an asynchronous generator, a synchronous AC generator, and an engine driven DC generator.

According to one embodiment, a method of operating a transport refrigeration system including a trailer system having vehicle connected to a transport container, the method including: operating an electric generation device at a frequency operating condition, the electric generation device operably connected to at least one of a wheel of the transport refrigeration system and a wheel axle of the transport refrigeration system, for harvesting kinetic energy from the operation of the trailer system; communicating the frequency operating condition from the electric generation device to a communicably coupled energy controller; storing an operating limit in the energy controller; comparing with the energy controller, the operating limit to the frequency operating condition; modifying the operation of the electric generation device with the energy controller to decouple the electric generation device from an energy storage device, when the frequency operating condition is equal to or less the stored operating limit; and modifying the operation of the electric generation device with an energy controller, following a time lapse, to re-couple to the electric generation device to the energy storage device.

In addition to one or more of the features described above, or as an alternative, further embodiments the method of operating a transport refrigeration system, wherein the electric generation device is operably connected to at least one of a wheel of the transport refrigeration system and a wheel axle of the transport refrigeration system.

In addition to one or more of the features described above, or as an alternative, further embodiments the method of operating a transport refrigeration system wherein a frequency operating condition includes at least one of: an operating frequency, a change in operating frequency, and a change in operating frequency over time.

In addition to one or more of the features described above, or as an alternative, further embodiments the method of operating a transport refrigeration system wherein the stored operating limit includes at least one of a limit and a range of: a frequency, a time period, a time interval, and wherein at least one of the limit and the range is indicative an anti-lock braking system (ABS) activation.

In addition to one or more of the features described above, or as an alternative, further embodiments the method of operating a transport refrigeration system wherein a frequency operating condition includes at least one of operating frequency, changes in operating frequency and/or changes in operating frequency over time.

In addition to one or more of the features described above, or as an alternative, further embodiments the method of operating a transport refrigeration system wherein modifying the operation of the electric generation device includes decoupling the electric generation device from the energy storage device when the energy controller operating limit is at least one of: a frequency of 25 Hz or less, and a negative speed variation equal to or less than −1 Hz per second, for an electric generation device operating frequency that is equal to or greater than 1 Hz and equal to or less than 10 Hz.

In addition to one or more of the features described above, or as an alternative, further embodiments the method of operating a transport refrigeration system wherein decoupling the electric generation device from the energy storage device occurs within 25 milliseconds of when the frequency operating condition is equal to or less the energy controller operating limit.

In addition to one or more of the features described above, or as an alternative, further embodiments the method of operating a transport refrigeration system wherein modifying the operation of the electric generation device includes recoupling the electric generation device and the energy storage device, after a lapse of time.

In addition to one or more of the features described above, or as an alternative, further embodiments the method of operating a transport refrigeration system wherein the lapse of time is equal to or greater than 60 seconds.

In addition to one or more of the features described above, or as an alternative, further embodiments the method of operating a transport refrigeration system wherein the energy storage device includes at least one of a battery, and a fuel cell.

In addition to one or more of the features described above, or as an alternative, further embodiments the method of operating a transport refrigeration system wherein the electric generation device includes at least one of: a permanent magnet AC generator, an asynchronous generator, a synchronous AC generator, and an engine-driven DC generator.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Refrigerated vehicles and refrigerated trailers used in connection with a transport refrigeration system may be equipped with an electric generation device, such as an AC synchronous generator that generates AC power for use or storage by the transport refrigeration system. In some embodiments, the electric generation device can be at least one of an axle generator and a hub generator operably coupled to a wheel axle, configured to recover rotational energy when the transport refrigeration system is in motion and convert that rotational energy to electrical energy, such as, for example, when the axle of the trailer system is rotating due to acceleration, cruising, or braking.

In general, the aim of an anti-lock brake system (ABS) is to prevent the vehicle wheels from locking during braking when the frictional forces between the tire and the road surface are not adequate to transmit the braking force from the tire to the road. An ABS typically uses an electronic braking control unit, which receives a wheel speed signal from one or more wheel speed sensors associated with each wheel of the vehicle and/or trailer, and at least one modulator to reduce momentarily, the braking pressure applied to one or more of the vehicle wheels if wheel lock is detected. If a vehicle is travelling on a split friction surface, the friction between the road surface and the wheel may vary from wheel to wheel, and this will affect the tendency of each wheel to lock. For example, the wheels on one side of the vehicle may travel over a patch of ice causing a loss of traction and wheel slippage, and in this case, the wheels on the ice will lock at lower braking pressures than other wheels. An "ABS braking event" refers to any event aboard the vehicle requiring automatic activation of ABS capability such as wheel slippage, i.e., an "ABS braking event", typically occurring on a road surface having a low threshold coefficient of friction.

When an ABS braking event occurs, it can cause the electric generation device to experience sudden changes or fluctuations in torque or rotational velocity, which may result in excessive torque loading or torque spikes. Rapid changes in torsional force may be damaging to electric generation device connected components such as bearings and gear box. Additionally, when a wheel experiences slippage prior to an ABS braking event, the wheel axle may rotate at an undesirably high speed, which can also damage the electric generation device 340. To prevent damage or unnecessary wear to the electric generation device 340 and connected components, it is desirable then to modify the operation of the electric generation device when rapid changes in frequency occur. A system and method for modifying the operation of the electric generation device by monitoring changes in frequency, is described below.

Figure 1:
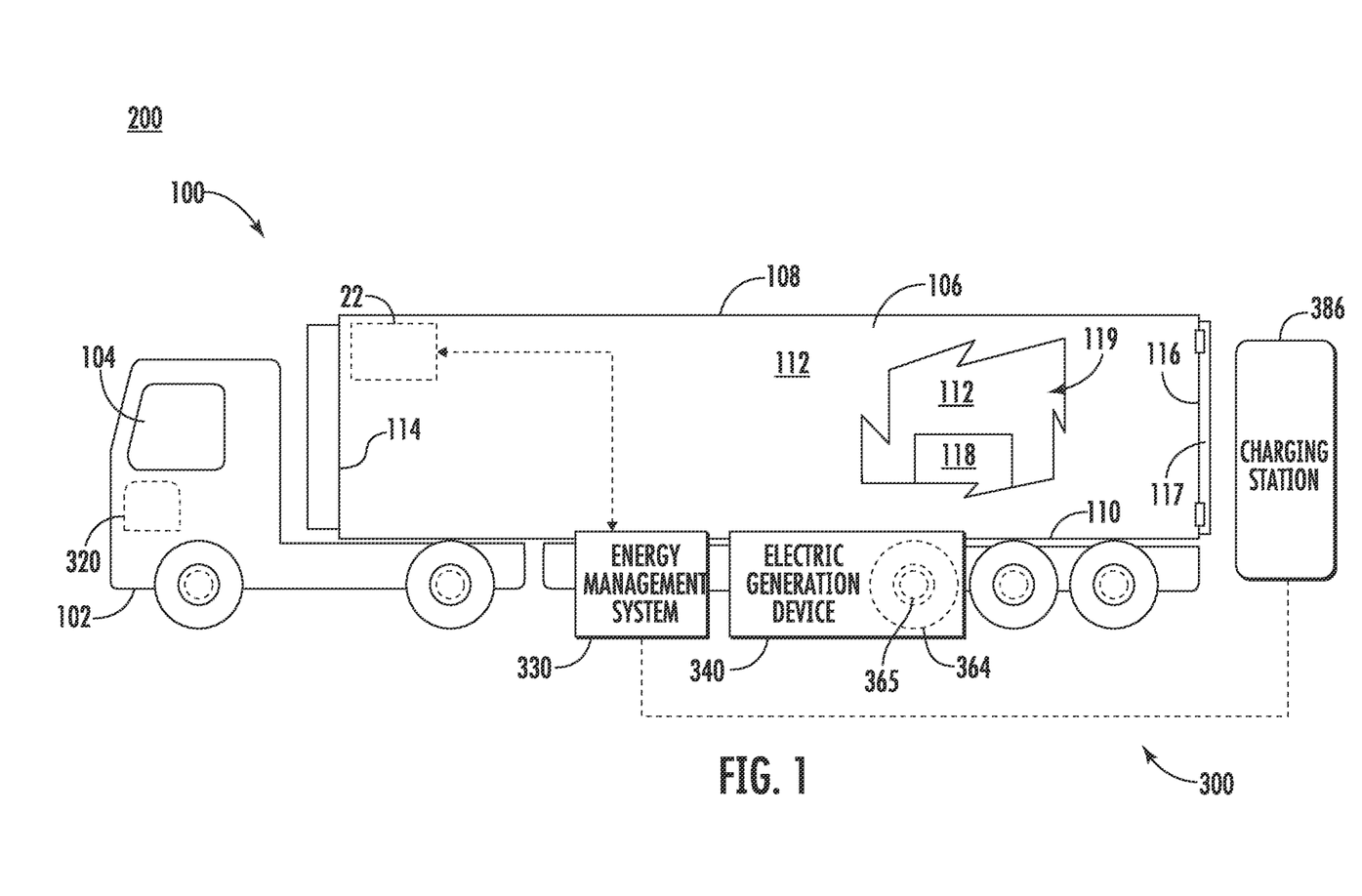
FIG. 1 is a schematic illustration of a transport refrigeration system, according to embodiments of the present disclosure.
Figure 2:
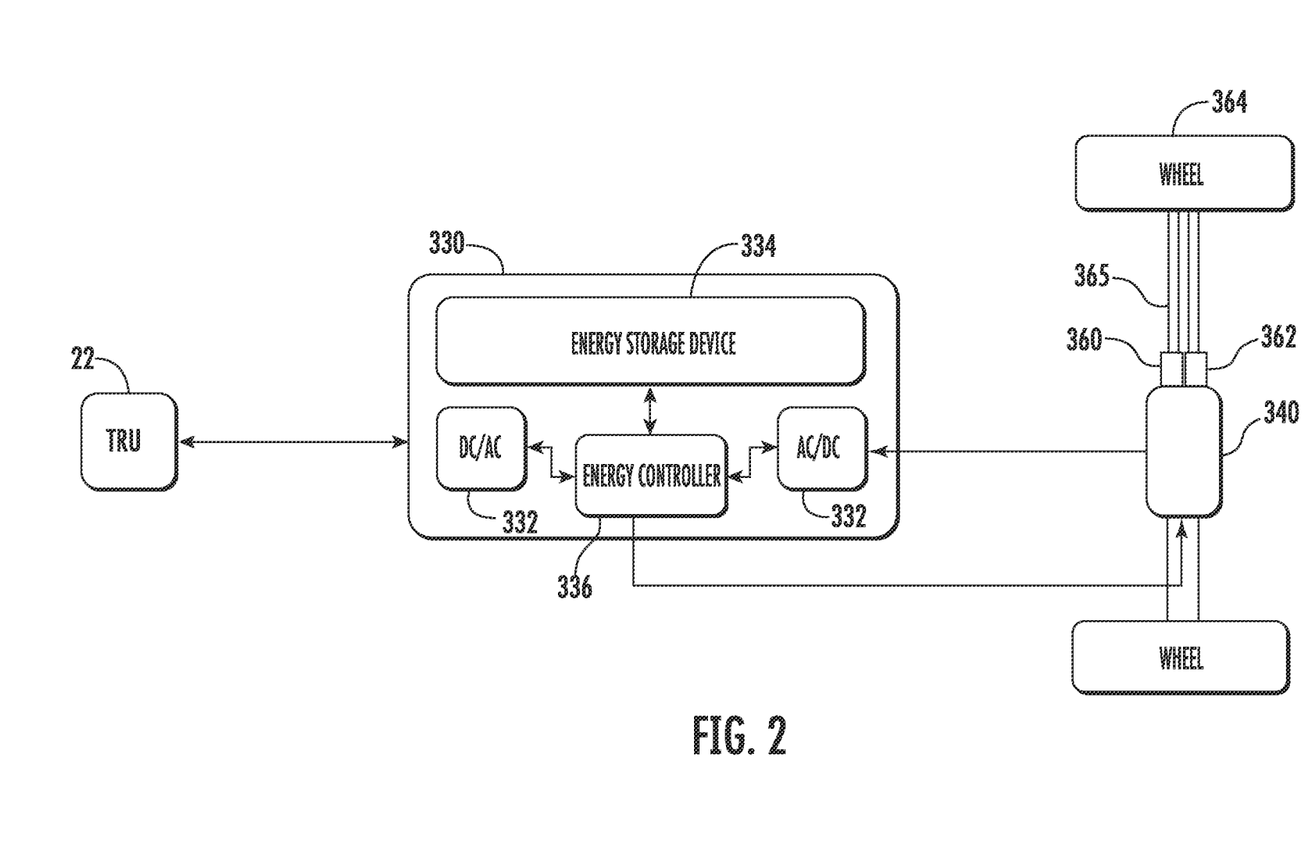
FIG. 2 is an enlarged schematic illustration of a portion of the transport refrigeration system of FIG. 1, according to embodiments of the present disclosure.

Referring to FIG. 1, a schematic illustration of a transport refrigeration system 200, and to FIG. 2, a portion of the transport refrigeration system, each according to embodiments of the present disclosure, is shown. The transport refrigeration system 200 is being illustrated as a trailer system 100, as seen in FIG. 1. The trailer system 100 includes a vehicle 102 integrally connected to a transport container 106. The vehicle 102 includes an operator's compartment or cab 104 and a propulsion motor 320 which acts as the drive system of the trailer system 100. The propulsion motor 320 is configured to power the vehicle 102. The energy source that powers the propulsion motor 320 may be at least one of compressed natural gas, liquefied natural gas, gasoline, electricity, diesel, or a combination thereof. The propulsion motor 320 may be an electric motor or a hybrid motor (e.g., a combustion engine and an electric motor). The transport container 106 is coupled to the vehicle 102. The transport container 106 may be removably coupled to the vehicle 102. The transport container 106 is a refrigerated trailer and includes a top wall 108, a directly opposed bottom wall 110, opposed side walls 112, and a front wall 114, with the front wall 114 being closest to the vehicle 102. The transport container 106 further includes a door or doors 117 at a rear wall 116, opposite the front wall 114. The walls of the transport container 106 define a refrigerated cargo space 119. It is appreciated by those of skill in the art that embodiments described herein may be applied to a tractor-trailer refrigerated system or non-trailer refrigeration such as, for example a rigid truck, a truck having refrigerated compartment.

Typically, transport refrigeration systems 200 are used to transport and distribute perishable goods and environmentally sensitive goods (herein referred to as perishable goods 118). The perishable goods 118 may include but are not limited to fruits, vegetables, grains, beans, nuts, eggs, dairy, seed, flowers, meat, poultry, fish, ice, blood, pharmaceuticals, or any other suitable cargo requiring temperature controlled transport. The transport refrigeration system 200 includes a transportation refrigeration unit 22. The transport refrigeration unit 22 may include a refrigerant compression device, an electric motor for driving the refrigerant compression device, and a controller. The controller may be configured to control the operation of the transport refrigeration system 200 including the operation of various components of the refrigerant unit 22 to provide and maintain a desired thermal environment within the refrigerated cargo space 119.

The transportation refrigeration unit 22 is in operative association with the refrigerated cargo space 119 and is configured to provide conditioned air to the transport container 106. The transportation refrigeration unit 22 functions, under the control of the controller 30, to establish and regulate a desired environmental parameters, such as, for example temperature, pressure, humidity, carbon dioxide, ethylene, ozone, light exposure, vibration exposure, and other conditions in the refrigerated cargo space 119, as known to one of ordinary skill in the art. In an embodiment, the transportation refrigeration unit 22 is capable of providing a desired temperature and humidity range.

The transportation refrigeration unit 22 may also include a refrigerant compression device, a refrigerant heat rejection heat exchanger, an expansion device, and a refrigerant heat absorption heat exchanger connected in refrigerant flow communication in a closed loop refrigerant circuit and arranged in a conventional refrigeration cycle. The transportation refrigeration unit 22 may also include one or more fans associated with the refrigerant heat rejection heat exchanger and driven by fan motor(s) and one or more fans associated with the refrigerant heat absorption heat exchanger and driven by fan motor(s). The transportation refrigeration unit 22 may also include a heater associated with the refrigerant heat absorption heat exchanger. The heater may be an electric resistance heater. It is to be understood that other components (not shown) may be incorporated into the refrigerant circuit as desired, including for example, but not limited to, a suction modulation valve, a receiver, a filter/dryer, an economizer circuit.

The trailer system 100 also includes an energy management system 330 and may include at least one of a power converter 332, an energy storage device 334, and an energy controller 336 for controlling the electric generation device 340, each as further described below.

The transportation refrigeration unit 22 has a plurality of electrical power demand loads on the energy storage device 334, including, but not limited to, a drive motor for a fan associated with the refrigerant heat rejection heat exchanger, and a drive motor for a fan associated with the refrigerant heat absorption heat exchanger. As each of the fan motors, and the refrigerant compression device motor may be an AC motor or a DC motor, it is to be understood that various power converters 332, such as AC to DC rectifiers, DC to AC inverters, AC to AC voltage/frequency converters, and DC to DC voltage converters, may be employed in connection with the energy storage device 334, as appropriate. Similarly, power converters 332 also manage power conversion between the electric generation device 340 and the energy storage device 334. Power converters 332 may be located within the energy management system 330 as illustrated in FIG. 2 and/or within the transportation refrigeration unit 22.

Examples of the storage device 340 may include a battery system (e.g., battery or battery bank) fuel cells, flow battery, and other devices capable of storing and outputting electric energy that may be DC. The energy storage device 334 may include a battery system, which may employ multiple batteries organized into battery banks, which battery system may be charged by a stationary charging station 386 such as, for example a wall 48V power outlet. The charging station 386 may provide single phase (e.g., level 2 charging capability) or three phase AC power to the energy storage device 334. It is understood that the charging station 386 may have any phase charging and are not limited to single phase or three phase AC power. For example, single phase AC power may be a high voltage DC power, such as, for example, 500 VDC.

The energy controller 336 may be an electronic controller including a processor and an associated memory including computer-executable instructions that, when executed by the processor, cause the processor to perform various operations. The processor of energy controller 336 may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be a storage device such as, for example, a random access memory (RAM), read only memory (ROM), or other electronic, optical, magnetic or any other computer readable medium. The energy controller 336 is communicably coupled to one or more of the transport refrigeration unit 22, the energy storage device 334, and the electric generation device 340. The energy controller 336 may be in wired or wireless communication with one or more of the transport refrigeration unit 22, the energy storage device 334, and the electric generation device 340. For example, wireless communication may occur via Wi-Fi, Bluetooth® such as low energy communications (BLE), and/or radio frequency (e.g., near field communications (NFC).

The energy controller 336 may be configured to receive, process and communicate signals between: the energy storage device 334 and the transport refrigeration unit 22 in response to load demands; power converters 332 in response, for example, to signals received from the electric generation device 340 and/or to the transport refrigeration unit; the electric generation device 340 and the energy storage device relating to the generation and storage of electrical energy; and the electric generation device and the energy storage device, in response to frequency data associated with the electric generation device 340.

As the trailer system 100 is in motion and the wheel axle 365 turns, the frequency of rotation of the wheel axle, which is also the frequency of the electric generation device 340, is related to the speed of the trailer system. The frequency of the electric generation device 340 may be determined based on a formula known to those skilled in the art. The electric generation device 340 may be configured to provide operating frequency data such as frequency, changes in frequency and/or changes in frequency over time (each, an "operating frequency") to the energy controller 336, from which the energy controller may determine when to modify the operation of the electric generation device. For example, the operating frequency may be communicated from the electric generation device 340 to the energy controller 336 via a rotary encoder 360 operably coupled to the electric generation device 340, and/or a frequency sensor 362 operably coupled or integral to the electric generation device 340. The operating frequency may be communicated to the energy controller 336 in real time or near real time indicating an electric generation device operating condition ("operating condition").

The energy controller 336 may be configured to include one or more predetermined operating limits and/or ranges ("operating limits") based on frequency data and indicative of ABS activation. The operating limits may be stored in an energy controller 336 memory. An operating limit may include at least one of frequency, changes in frequency, and/or changes in frequency over time. The energy controller 336 may be further configured to compare one or more frequency operating conditions to one or more operating limits. As described below, under certain condition, the energy controller 336 is configured to modify the operation of the electric generation device 340. In general, under normal operating conditions a trailer system 100 may operate at an average speed of 90 kilometers per hour (Km/hr), which may approximate to an average electric generation device frequency of 90 Hz. In one non-limiting embodiment, the energy controller 336 may modify the operation of the electric generation device 340 when the average speed of the trailer system 100 is equal to or less than 26 Km/hr and/or the electric generation device frequency drops to 25 Hz or less. In this embodiment, no modification occurs if the drop in speed was due to normal trailer system operation (e.g., normal deceleration by applying the brakes under normal operating conditions or due to lifting the operator's foot from the accelerator pedal). In another non-limiting embodiment, energy controller 336 may modify the operation of the electric generation device 340 when the electric generation device experiences a rapid reduction in operating frequency (e.g., a negative speed variation at a slew rate of −1 Hz per second (or less) for signals in a frequency range equal to or greater then 1 Hz and equal to or less than 10 Hz). When the energy controller 336 detects that a frequency operating condition is greater than an operating limit, then the energy controller 336 may be configured to allow the electric generation device to continue normal operation, without interruption. When the energy controller 336 detects that a frequency operating condition that is equal to or less than an operating limit, then the energy controller 336 may be configured to modify the operation of the electric generation device, discussed below.

The electric generation device 340 is configured to harvest electrical power from kinetic energy of the trailer system 100. The electric generation device 340 can be at least one of an axle generator and a hub generator configured to recover rotational energy when the transport refrigeration system 200 is in motion and converts rotational energy to electrical energy, such as, for example, when the axle 365 of the trailer system 100 is rotating due to acceleration, cruising, or braking.

The electric generation device 340 may be mounted on or operably connected to a wheel axle 365 of the trailer system 100 and the hub generator may be mounted on a wheel 364 of the trailer system 100. It is understood that the electric generation device 340 may be mounted on any wheel 364 or axle 365 of the trailer system 100. An example of and the mounting location of the electric generation device 340 illustrated in FIG. 2 is one example of a mounting location. The electric generation device 340 will then use the generated electrical power to charge the energy storage device 334. In an alternate embodiment, the electric generation device 340 may be operably connected to the wheel axle 365 or wheel 364 through at least one mechanical linkage, such as, for example a drive shaft, belt system, or gear system (e.g., gear box). The mechanical linkage is configured to rotate the electric generation device 340 as the wheels 364 or wheel axle 365 rotates when the electric generation device 340 is activated.

The electric generation device 340 may include a single on-board, engine driven AC generator configured to generate alternating current (AC) power including at least one AC voltage at one or more frequencies. In an embodiment, the electric generation device 340 may, for example, be a permanent magnet AC generator, asynchronous generator, or a synchronous AC generator. In another embodiment, the electric generation device 340 may include a single on-board, engine driven DC generator configured to generate direct current (DC) power (e.g., at least one voltage).

Figure 3:
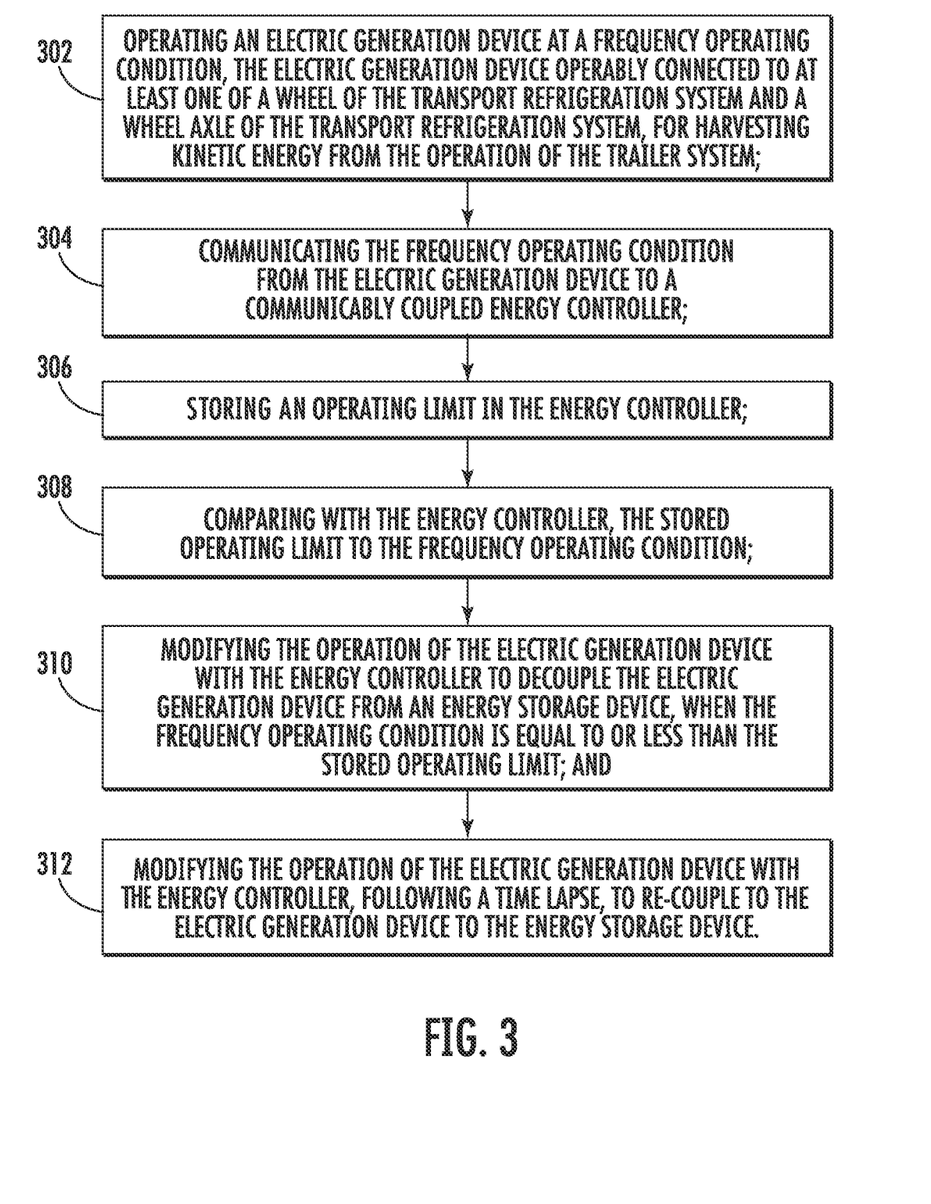
FIG. 3 is a flow process illustrating a method of operating the transport refrigeration system of FIGS. 1 and 2, according to an embodiment of the present disclosure.

Turning to FIG. 3, a method for operating a transport refrigeration system 200 according to embodiments of the present disclosure is shown. The method begins in block 302 with operating an electric generation device 340 at a frequency operating condition. The electric generation device may be operably connected to at least one of a wheel 364 of the transport refrigeration system 200 and a wheel axle 365 of the transport refrigeration system, for harvesting kinetic energy from the operation of the trailer system 100. In this block, the trailer system 100 is being operated under normal operating conditions (e.g., the truck/trailer is travelling along a roadway), such as at full load absent ABS activation, or at a reduced electric generation device frequency that may result from deceleration due to normal braking or deceleration without brakes being applied (i.e., the drive lets foot of accelerator pedal). The electric generation device 340 may be configured to communicate at least one frequency operating condition, which may include operating frequency, changes in operating frequency and/or changes in operating frequency over time, to an energy controller 336. The energy controller is configured to control the operation of the electric generation device 340, as described below.

In block 304, the method includes communicating a frequency operating condition from the electric generation device to a communicably coupled energy controller 336.

In block 306, the method includes storing an operating limit in the energy controller 336. An operating limit is based on at least one of frequency, changes in frequency and/or changes in frequency over time, each of which may indicate ABS activation. For example, a frequency operating condition may include a rapid frequency variation from a high frequency to a low frequency (e.g., when the average speed of the trailer system 100 is equal to or less than 26 Km/hr and/or the electric generation device frequency drops to 25 Hz or less). Modification would not occur if the drop in speed was due to normal operation (e.g., normal deceleration by applying the brakes under normal operating conditions or due to lifting the operator's foot from the accelerator pedal). A frequency operating condition may also include a rapid frequency variation over a predetermined period of time (e.g., a negative speed variation at a slew rate of −1 Hz per second (or less) for signals in a frequency range equal to or greater than 1 Hz and equal to or less than 10 Hz).

In block 308, the method includes comparing with the energy controller 336, a stored operating limit to a frequency operating condition. In block 310, the method includes modifying the operation of the electric generation device using an energy controller, to decouple the electric generation device from an energy storage device when the frequency operating condition is equal to or less the stored operating limit. Modifying the operation of the electric generation device may include electrically disconnecting (e.g., decoupling) the energy storage device 334 from the electric generation device 340 by using the energy controller 336 to activate a switch, and/or reduce the operating frequency to a nominal value (e.g., zero). In general, it is desirable to rapidly decouple the electric generation device 340 from the energy storage device 334. In one non-limiting embodiment, the energy controller 336 may be configured to decouple the energy storage device 334 from the electric generation device 340 within 25 milliseconds of determining that the frequency operating condition is equal to or less than a stored operating limit.

In block 312, the method includes modifying the operation of the electric generation device 340 using an energy controller 336 to re-couple to the electric generation device and the energy storage device after a predetermined time lapse. The energy controller 336 may be configured to electrically recouple the electric generation device with the energy controller following a time delay. In one non-limiting embodiment, the energy controller recouples the electric generation device 340 and the energy storage device 334, after a predetermined time lapse stored in the energy controller, such as 60 seconds.

Recoupling may occur in a manner similar to decoupling. For example, the energy controller may be configured to activate a switch to allow the energy storage device and electric generation device 340 to recouple. In non-limiting embodiment, recoupling may include increasing the operating frequency of the electric generation device. For example, the method may include gradually activating the load on the electric generation device 340 over a period of time. In one non-limiting embodiment, the method may include increasing the load in increments (load/time) based on the electric generation device maximum operating load or based on a nominal load. For example, increasing the load on the electric generation device 340 may begin at 20% of nominal load, with increases of 20% each 30 seconds until reaching nominal power under normal operating conditions.

While the above description has described the flow process of FIG. 3 in a particular order, it should be appreciated that unless otherwise specifically required in the attached claims that the ordering of the steps may be varied.

As described above, embodiments can be in the form of processor-implemented processes and devices for practicing those processes, such as processor. Embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the exemplary embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A transport refrigeration system comprising:
    a trailer system comprising a vehicle connected to a transport container;
    an electric generation device operably connected to a wheel axle of the trailer system, the electric generation device configured to rotate at an operating frequency, and to generate electrical power from the rotational energy of the wheel axle for charging an energy storage device when the electric generation device is activated; and
    an energy management system for providing power to a transportation refrigeration unit of the trailer system, the energy management system comprising an energy controller in communication with at least one of the electric generation device and the energy storage device, wherein the energy controller is configured to modify the operation of the electric generation device by decoupling the electric generation device from the energy storage device when the operating frequency of the electric generation device is equal to or less than an energy controller operating limit, wherein the energy controller operating limit comprises at least one of a limit and a range of: a frequency, a time period, and a time interval, and wherein at least one of the limit and the range is indicative of an anti-lock braking system (ABS) activation.

2. The transport refrigeration system of claim 1, wherein the operating frequency comprises at least one of a limit and a range of: a frequency, a time period, and a time interval, of the electric generation device.

3. The transport refrigeration system of claim 1, wherein modifying the operation of the electric generation device comprises decoupling the electric generation device from the energy storage device when the energy controller operating limit is at least one of:
    a frequency of 25 Hz or less, and
    a negative speed variation equal to or less than −1 Hz per second, for an electric generation device operating frequency that is equal to or greater than 1 Hz and equal to or less than 10 Hz.

4. The transport refrigeration system of claim 3, wherein decoupling of the electric generation device from the energy storage device occurs within 25 milliseconds of when the frequency operating condition is equal to or less than the operating limit.

5. The transportation refrigeration system of claim 1, wherein modifying the operation of the electric generation device comprises recoupling the electric generation device to the energy storage device after a lapse of time.

6. The transportation refrigeration system of claim 5, wherein the lapse of time is equal to or greater than 60 seconds.

7. The transport refrigeration system of claim 1, wherein the energy storage device comprises at least one of a battery, and a fuel cell.

8. The transport refrigeration system of claim 1, wherein the electric generation device comprises at least one of: a permanent magnet AC generator, an asynchronous generator, a synchronous AC generator, and an engine driven DC generator.

9. A method of operating a transport refrigeration system comprising a trailer system having vehicle connected to a transport container, the method comprising:
    operating an electric generation device at a frequency operating condition;
    communicating the frequency operating condition from the electric generation device to a communicably coupled energy controller;
    storing an operating limit in the energy controller;
    comparing with the energy controller, the operating limit to the frequency operating condition;
    modifying the operation of the electric generation device with the energy controller to decouple the electric generation device from an energy storage device, when the frequency operating condition is equal to or less the stored operating limit, wherein the stored operating limit comprises at least one of a limit and a range of: a frequency, a time period, a time interval, and where at least one of the limit and the range is indicative an anti-lock braking system (ABS) activation; and
    modifying the operation of the electric generation device with an energy controller, following a time lapse, to re-couple to the electric generation device to the energy storage device.

10. The method of operating a transport refrigeration system of claim 9, wherein the electric generation device is operably connected to at least one of a wheel of the transport refrigeration system and a wheel axle of the transport refrigeration system.

11. The method of operating a transport refrigeration system of claim 10, wherein the frequency operating condition comprises at least one of: an operating frequency, a change in operating frequency, and a change in operating frequency over time.

12. The method of operating a transport refrigeration system of claim 9, wherein modifying the operation of the electric generation device comprises decoupling the electric generation device from the energy storage device when the energy controller operating limit is at least one of:

a frequency of 25 Hz or less, and a negative speed variation equal to or less than −1 Hz per second, for an electric generation device operating frequency that is equal to or greater than 1 Hz and equal to or less than 10 Hz, wherein decoupling the electric generation device from the energy storage device occurs within 25 milliseconds of when the frequency operating condition is equal to or less the energy controller operating limit.

13. The method of operating a transportation refrigeration system of claim 12, wherein the lapse of time is equal to or greater than 60 seconds.

14. The method of operating a transport refrigeration system of claim 9, wherein the energy storage device comprises at least one of a battery, and a fuel cell.

15. The method of operating a transport refrigeration system of claim 9, wherein the electric generation device comprises at least one of: a permanent magnet AC generator, an asynchronous generator, a synchronous AC generator, and an engine-driven DC generator.

* * * * *